(12) United States Patent
Negishi et al.

(10) Patent No.: US 7,605,869 B2
(45) Date of Patent: Oct. 20, 2009

(54) DATA COMBINING DEVICE AND DATA COMBINING METHOD

(75) Inventors: Shinji Negishi, Kanagawa (JP); Kazunori Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 587 days.

(21) Appl. No.: 10/550,314

(22) PCT Filed: Mar. 30, 2004

(86) PCT No.: PCT/JP2004/004506

§ 371 (c)(1),
(2), (4) Date: Sep. 22, 2005

(87) PCT Pub. No.: WO2004/090859

PCT Pub. Date: Oct. 21, 2004

(65) Prior Publication Data

US 2006/0215061 A1    Sep. 28, 2006

(30) Foreign Application Priority Data

Apr. 1, 2003    (JP) .............................. 2003-098015

(51) Int. Cl.
*H04N 9/76* (2006.01)
(52) U.S. Cl. .................................................. 348/584
(58) Field of Classification Search ................. 348/584, 348/563–565, 568, 588, 598
See application file for complete search history.

(56) References Cited

U.S. PATENT DOCUMENTS 5,657,095 A * 8/1997 Yoshida et al. ............... 348/584
5,805,237 A * 9/1998 Nakatani et al. ............. 348/589
6,046,777 A * 4/2000 Patton et al. ................. 348/565
6,144,415 A * 11/2000 Patton et al. ................. 348/565
6,606,127 B1 * 8/2003 Fang et al. ................... 348/500
6,961,097 B2 * 11/2005 Yui ............................. 348/584

FOREIGN PATENT DOCUMENTS

| JP | 05-216465 | 8/1993 |
|---|---|---|
| JP | 05-244530 | 9/1993 |
| JP | 07-020838 | 1/1995 |
| JP | 07-140954 | 6/1995 |
| JP | 09-204164 | 8/1997 |
| JP | 10-290395 | 10/1998 |
| JP | 2000-278622 | 10/2000 |
| JP | 2002-237791 | 8/2002 |
| JP | 2002-335445 | 11/2002 |

OTHER PUBLICATIONS

Japanese Office Action issued on Mar. 4, 2008 in connection with Japanese Patent Application No. 2003-098015.

* cited by examiner

*Primary Examiner*—Paulos M Natnael
(74) *Attorney, Agent, or Firm*—Sonnenschein Nath & Rosenthal LLP

(57) ABSTRACT

A data combining apparatus and a data combining method in which timing for transformation, movement (arrangement), and generation of data combined in accordance with timing information can be corrected and a screen formation to be needed for matching of timing can be formed by combination, wherein a data combining apparatus 100 generates timing information of a change of the screen formation by a timing information generation unit 108 and synchronizes generation timing in the graphics generation unit 103 to process timing for image data in a transformation and movement processing unit 105 to enable combination of the image data and the graphics without timing deviation to thereby obtain desired combined data in a combining unit 107.

18 Claims, 11 Drawing Sheets

DATA COMBINING DEVICE AND DATA COMBINING METHOD

TECHNICAL FIELD

The present invention relates to a data combining apparatus preferably used in such as a TV broadcast receiver, a TV monitor, a PC monitor, an editing apparatus, and a multimedia data reproduction apparatus for combining still image data, moving image data, or graphics data to form a screen and a method for the same.

BACKGROUND ART

As a data combining apparatus for combining still image data, moving image data, or graphics data to form a screen, there is known, for example, a computer graphics system for synchronizing color data, depth data, texture data, or other data processed asynchronously (refer to Patent Document 1: Japanese Unexamined Patent Publication (Kokai) No. 9-6973) or a computer graphics system for combining a plurality of three-dimensional images in a two-dimensional graphics image processing pipeline and finally for performing rendering of the combined image on a display screen (refer to Patent Document 2: Japanese Unexamined Patent Publication (Kokai) No. 2001-357410).

FIG. 1 is a block diagram of an example of the configuration of a conventional data combining apparatus combining still image data, moving image data, or graphics data etc. to form a screen.

The data formation apparatus 10, as shown in FIG. 1, has a screen formation control unit 11, a graphics control unit 12, a graphics generation unit 13, an image control unit 14, a transformation and movement control unit 15, an image processing unit 16, and a combining unit 17.

The screen formation control unit 11 controls when and how data to be combined should be transformed (enlarged or reduced) and where the result should be moved (arranged) and combined on a screen.

The graphics control unit 12 controls the graphics generation unit 13 and generates graphics to be needed for a combined screen instructed from the screen formation control unit 11. The generated graphics S13 to be combined is input to the combining unit 17.

On the other hand, the image control unit 14 controls the transformation and movement processing unit 15 of the image and transforms and moves an input image data SIM to correspond to the combined screen instructed from the screen formation control unit 11. The transformed and moved image data S15 may be further processed by the image processing unit 16.

The image processing unit 16 performs, for example, filtering for an improvement of image quality and conversion of the image format. Note that, the image processing unit 16 sometimes is not provided. Also, similarly, a graphics processing unit not shown in the figures may be placed at the latter stage of the graphics generation unit 13.

The transformed and moved image data S15 is input to the combining unit 17 as image data S16 to be combined.

The combining unit 17 combines the input graphics S13 to be combined and the input image data S16 to be combined to output the combined data S17.

For example, a TV monitor or a PC monitor forms a menu provided to the user as a graphics, superposes the same on image data to be displayed, and displays the result. Such a system has also been called an "on-screen-display (OSD)".

Further, the data combining apparatus shown in FIG. 1 is used in a service such as digital television broadcasting in which image data and graphics data are transmitted and a screen formation formed by combining the both is provided.

On the other hand, the combination system 10 shown in FIG. 1 does not strictly adjust the timing of the graphics S13 to be combined and the image data S16 to be combined.

Therefore, in the conventional data combining apparatus, there are disadvantages that it cannot accurately realize a screen formation such that transformation and movement (arrangement) of the data to be combined are included and specifically such that the amount of transformation and movement and arrangement position change continuously.

This point will be further considered with reference to FIG. 2A to FIG. 2C and FIG. 3A to FIG. 3C.

FIG. 2A to FIG. 2C are views showing an example of combination of the screen formation such that transformation and movement (arrangement) of the data to be combined are included and specifically the amount of transformation and movement and the arrangement position change continuously. FIG. 2A shows the graphics S13 to be combined, FIG. 2B shows the image data S16 to be combined, and FIG. 2C shows the combined data S17 respectively.

As shown in the figures, at the time T1, the transformation (reduction) and movement of the image data S16 to be combined is started.

In accordance with image data to be moved after the reduction, available graphics is generated at a region in which the image data does not exist.

In the example shown in FIG. 2A to FIG. 2C, the image data S16 and S17 are continuously reduced and moved along with the elapse. The available graphics region changes due to this.

As long as the image data S16 to be combined and the graphics S13 to be combined are combined at an accurate timing, the two regions are made correspondence accurately.

On the other hand, if the timing of the transformation and movement of the image data and the timing of the generation of the graphics deviate from each other, desirable combined data cannot be achieved.

FIG. 3A to FIG. 3C are views showing an example of combination in the case where the start of the transformation and movement of the image data is delayed by one frame's worth of time. FIG. 3A shows the graphics S13 to be combined, FIG. 3B shows the image data S16 to be combined, and FIG. 3C shows the combined data S17 respectively.

As shown in the figures, at the time T1, the change in the screen formation is started, and the graphics is generated at the accurate timing.

The example shown in FIG. 3A to FIG. 3C shows an example in which the start of the transformation (reduction) and movement of the image data to be combined is delayed at the time T2.

At the time T1, the image data S16 in which the change of the screen formation has not been started and the graphics S13 in which the same has been started are input to the combining unit 17, so that contradictory combined data is output.

Generally, since the graphics is superposed and combined at the front of the image data in the OSD, FIG. 3A to FIG. 3C show the case of superposing the graphics at the front of the image data. Similarly to this, in the case of superposing the image data at the front of the graphics, the contradictory combined data is output.

Further, the delay of the start of the transformation (reduction) and movement of the image data to be combined is propagated to subsequent timings of combination and consequently the combination is successively performed with the deviated timing of the screen formation.

This is because, as described above, in the conventional data combining apparatus combining image data and graphics data etc. to form the screen, the accurately timing adjustment for combining the graphics to be combined and the image data to be combined does not performed.

Particularly, in the case where each of the control units (the screen formation control unit, the image control unit, and the graphics control unit) is configured by a plurality of processors, in the case where communication paths between the control units or between a control unit and a processing unit (the transformation and movement processing unit or the graphics generation unit) are connected by buses including delay, or in the case where the communication takes time, the delay easily occurs until a notice of change of the screen formation is actually reflected to the transformation and movement processing unit or the graphics generation unit.

Also, in the case where each of the control units or processing units is configured by software, the delay easily occurs.

Further, if the image data and the graphics are asynchronous, the case where the timings of the two are deviated is similar to the case where any one of them is delayed.

Therefore, in the conventional data combining apparatus, it is difficult to realize a screen formation including transformation and movement (arrangement) of the data to be combined and specifically needing to adjust the timing such that the transformation and amount of movement and the arrangement position are changed continuously.

Namely, in the OSD, restrictions that the graphics and the image data to be combined have no relation in time are imposed.

In a screen formation combining a graphics at a region without the transformed and moved (arranged) image data, use is made under the restriction that the screen formation be one in which the amount of transformation and movement and the arrangement position do not change continuously.

Under the latter restriction, when the screen formation is switched, due to the deviation of timing of the image data and the graphics, a contradictory combined image is displayed.

DISCLOSURE OF THE INVENTION

An object of the present invention is to provide a data combining apparatus capable of correcting timing for transformation, movement (arrangement), or generation of data combined in accordance with the timing information and capable of combining a screen formation to be needed for adjustment of a timing and a data combining method of the same.

To achieve the object, according to a first aspect of the present invention, there is provided a data combining apparatus combining first data and second data relating to an image to form a screen, the apparatus having: a processing unit for performing predetermined processing on the first data; a data generation unit for generating the second data; a combining unit for combining the first data processed by the predetermined processing in the processing unit and the second data generated by the data generation unit; a timing information generation unit for generating timing information for the processing of the processing unit or for processing of a generation of the data generation unit so that the combination of the first data processed by the predetermined processing in the processing unit and the second data generated by the generation unit is performed at the same timing; and a control unit for correcting the processing timing or generation timing to make the processing unit or the data generation unit perform the predetermined processing or the data generation based on the timing information generated by the timing information generation unit.

A second aspect of the present invention provides a data combining apparatus combining first data and second data relating to an image to form a screen, the apparatus having: a processing unit for performing predetermined processing on the first data; a data generation unit for generating the second data; a combining unit for combining the first data processed by the predetermined processing in the processing unit and the second data generated by the data generation unit; and a timing information generation unit for generating at least one of the timing information of the processing in the processing unit and the processing for a generation in the data processing unit so that the combination of the first data processed by the predetermined processing in the processing unit and the second data generated by the generation unit is performed at the same timing in the combining unit. The combining unit corrects the two data to perform the combination at the same timing based on the timing information generated by the timing information generation unit.

Preferably, the data combining apparatus has a second processing unit performing processing to introduce delay to the first data processed by the predetermined processing by the processing unit, and the timing information generation unit adds an amount of delay in the second processing unit and generates the timing information indicating an input timing to the combining unit.

Preferably, the timing information generation unit generates the timing information including a countdown up to a start of a change of screen formation.

Further, preferably, a data combining apparatus further has a superposition unit for superposing the timing information generated by the timing information generation unit to the first data or the second data, and corrects the two data to perform the combination at the same timing based on the superposed timing information.

Preferably, the superposition unit superposes the timing information at a blanking period of the first data or the second data relating to the image.

A third aspect of the present invention provides a data combining method for combining first data and second data relating to an image to form a screen, the method having: a first step of performing predetermined processing on the first data; a second step of generating the second data; and a third step of combining the first data processed by the predetermined processing at the first step and the second data generated by the data generation unit, and the timing information for the processing at the first step or the processing for generation at the second step is generated so that the combination of the first data processed by the predetermined processing at the first step and the second data generated at the second step is performed at the same timing, and at the first step or at the second step, the timing of processing or generation is corrected based on the timing information to perform the predetermined processing or data generation.

A fourth aspect of the present invention provides a data combining method combining first data and second data relating to an image to form a screen, the method having: a first step of performing predetermining processing on the first data; a second step of generating the second data; and a third step of combining the first data processed by the predetermined processing at the first step and the second data generated by the data generation unit, at least one of the timing information for the processing at the first step and the generation processing at the second step being generated so that the combination of the first data processed by the predetermined processing at the first step and the second data generated at the second step is performed at the same timing in the third step, and at the third step, the combination being corrected based on the timing information so as to be performed at the same timing.

According to the present invention, for example, the transformation and movement processing unit for the image data as the first data or the second data or the generation unit for graphics data as the second data or the first data generates the timing information for the screen formation and corrects the timing of the transformation and movement processing or the generation processing for one set of data based on the timing information of another set of data to match with the timing of the two data.

Further, according to the present invention, the transformation and movement processing unit for the image data as the first data or the second data and/or the generation unit for the graphics as the second or the first data generates the timing information for the screen formation and combines the data at the corresponding timing based on the two timing information to make the timings of the two data match.

According to the present invention, since the correction may be performed based on the timing information so that the two data of the corresponding timings are combined and output even if the timing of start of the screen formation is delayed or if it is early or a deviation in timing occurs in the middle of a change of the screen formation, desired combined data is obtained in the screen formation including transformation and movement (arrangement) of data to be combined and specifically needing to adjust the timing so that the amount of transformation and movement and the arrangement position change continuously.

BEST MODE FOR CARRYING OUT THE INVENTION

Below, embodiments of the present invention will be explained with reference to the attached drawings

FIRST EMBODIMENT

Figure 4:
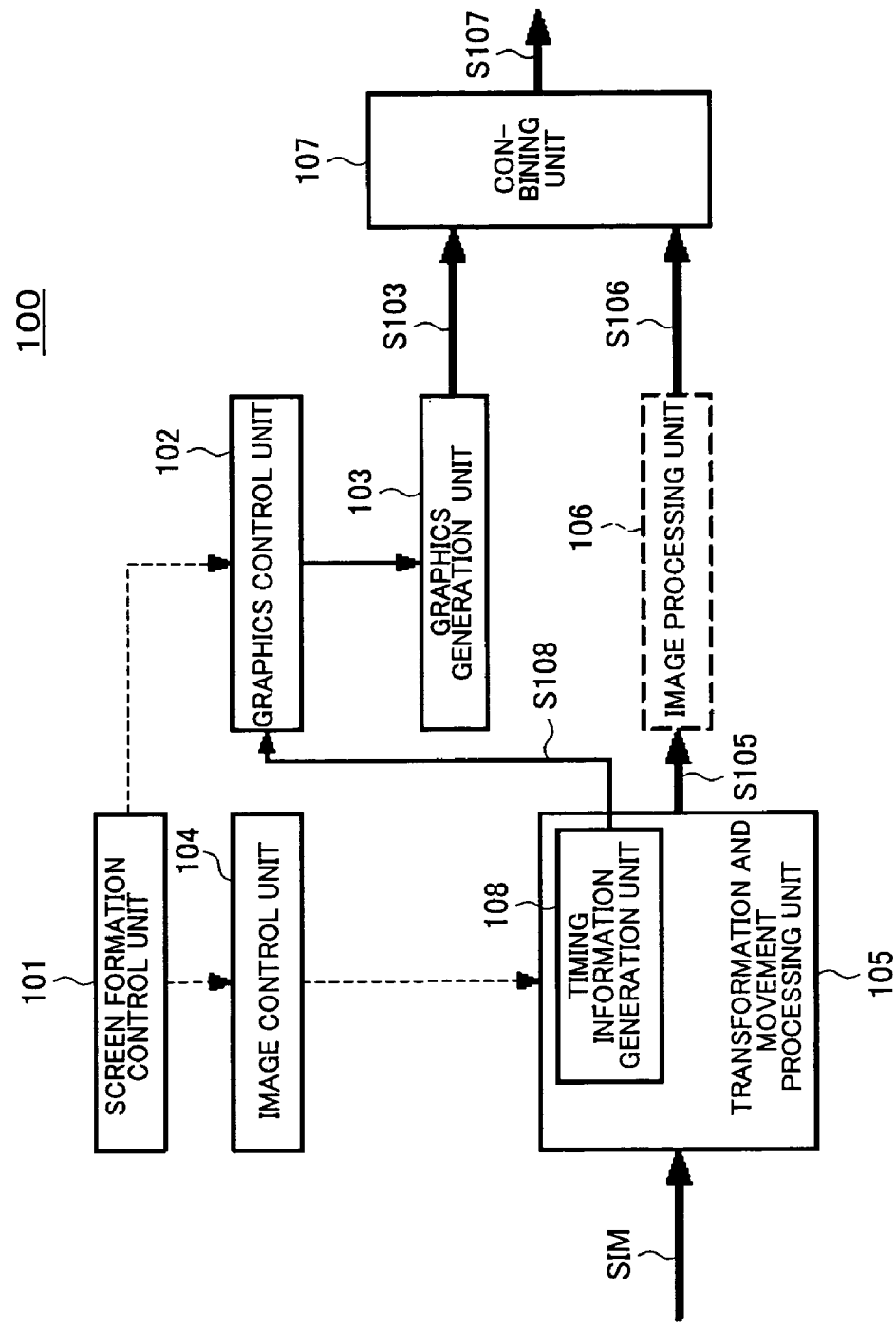
FIG. 4 is a block diagram of a first embodiment of a data combining apparatus according to the present invention.

FIG. 4 is a block diagram showing a first embodiment of a data combining apparatus according to the present invention.

The data combining apparatus 100 generates timing information for a change of a screen formation and matches the timing of generation for graphics with the timing of transformation and movement processing on image data as first data or second data so as to enable combination of graphics as the second data or the first data without timing deviation (timing difference) and the image data to thereby obtain desired combined data.

The data combining apparatus 100, as shown in FIG. 4, has a screen formation control unit 101, a graphics control unit 102, a graphics generation unit 103, an image control unit 104, a transformation and movement processing unit 105 as a processing unit, an image processing unit 106 as a second processing unit, a combining unit 107, and a timing information generation unit 108 of image data.

The screen formation control unit 101 controls when and how data to be combined should be transformed (enlarged or reduced) and where the result should be moved (arranged) and combined on a screen.

The graphics control unit 102 detects and corrects the timing deviation of the image data based on the timing information S108 of the change of the screen formation by the timing information generation unit 108 and controls the graphics generation unit 103 to generate the graphics to be needed for the combined screen instructed from the screen formation control unit 101 so as to match the corrected timing based on the timing information S108.

The graphics generation unit 103 generates the graphics to be needed for the combined screen instructed from the screen formation control unit 101 under the control of the graphics control unit 102 in accordance with the timing information S108, then outputs the result as graphics S103 to be combined to the combining unit 107.

Note that, a graphics processing unit not shown in the figures may be arranged at the latter stage of the graphics generation unit 13.

The image control unit 104 controls the transformation and movement processing unit 105 for the image and transforms and moves input image data SIM so as to correspond to the combined screen instructed from the screen formation control unit 101.

The transformation and movement processing unit 105 transforms and moves the input image data SIM under the control of the image control unit 104 so as to correspond to the combined screen in accordance with the instruction from the screen formation control unit 101 and outputs transformed and moved image data S105, for example, to the image processing unit 106.

The image processing unit 106 performs, for example, filtering for improvement of image quality and conversion of the image format on the transformed and moved image data S105 from the transformation and movement processing unit 105 and outputs the result as image data S106 to be combined to the combining unit 107.

Note that the image processing unit 106 sometimes is not provided. Similarly, a graphics processing unit not shown in the figures may be arranged at the latter stage of the graphics generation unit 13.

The combining unit 107 combines the input graphics S103 to be combined and the image data S16 to be combined and outputs combined data S107.

The timing information generation unit 108 is placed in the transformation and movement processing unit 105 of the image data, generates the timing information S108 for the change of the screen formation, and outputs the same to the graphics control unit 102.

The timing information S108 generated by the timing information generation unit 108 generates the timing information in accordance with, for example, a first case where the image processing unit has no delay and the graphics control unit and the graphics generation unit can immediately respond to the timing information, a second case where the graphics control unit 102 and the graphics generation unit 103 need delay until the timing information S108 is reflected, or a third case where the graphics control unit 102 and the graphics generation unit 103 need delay until the timing information S108 is reflected due to introduction of a countdown to the timing information.

Hereinafter, control operations based on the timing information at the first case, the second case, and the third case will be successively explained with reference to the figures.

First, with reference to FIG. 5A to FIG. 5D, the control operation based on the timing information in the first case will be explained.

FIG. 5A to FIG. 5D are views for explaining the case where the image processing unit has no delay and the graphics control unit and the graphics generation unit can immediately respond to the timing information.

Figure 5:
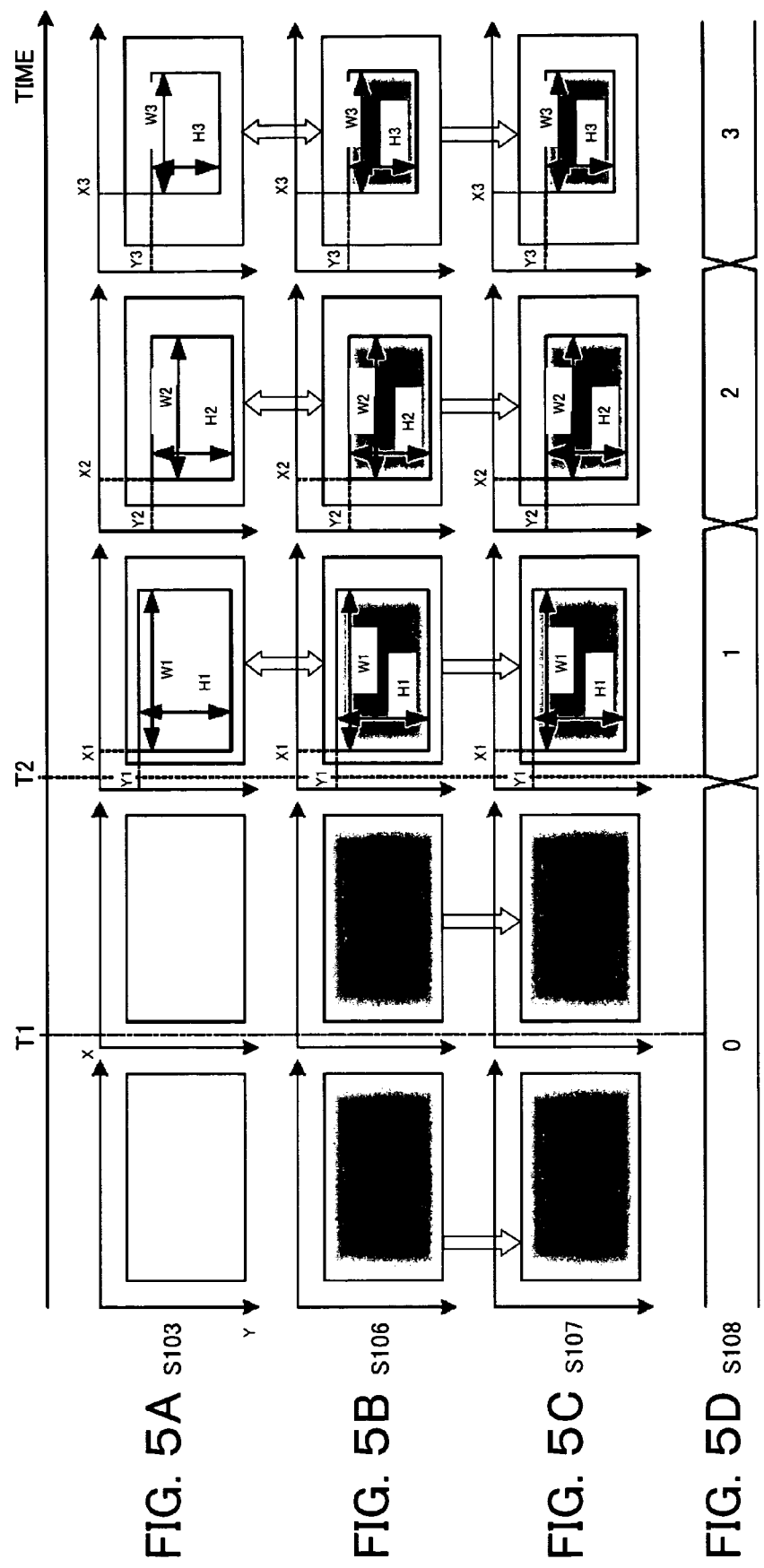
FIG. 5A to FIG. 5D are views for explaining the case in the first embodiment where an image processing unit has no delay and a graphics control unit and a graphics generation unit can respond to the timing information immediately.

FIG. 5A shows the graphics S103 to be combined, FIG. 5B shows the image data S106 to be combined, FIG. 5C shows the combined data S107, and the FIG. 5D shows the timing information S108, respectively.

In this case, the screen formation control unit 101 controls the change of the screen formation to be performed from the time T1.

However, the start of the transformation and movement processing of the image data by the transformation and movement processing unit 105 is delayed and the processing is started at the time T2.

Therefore, the timing information S108 at the time T1 indicates "not-start (in an example shown in FIG. 5D, "0")".

Figure 1:
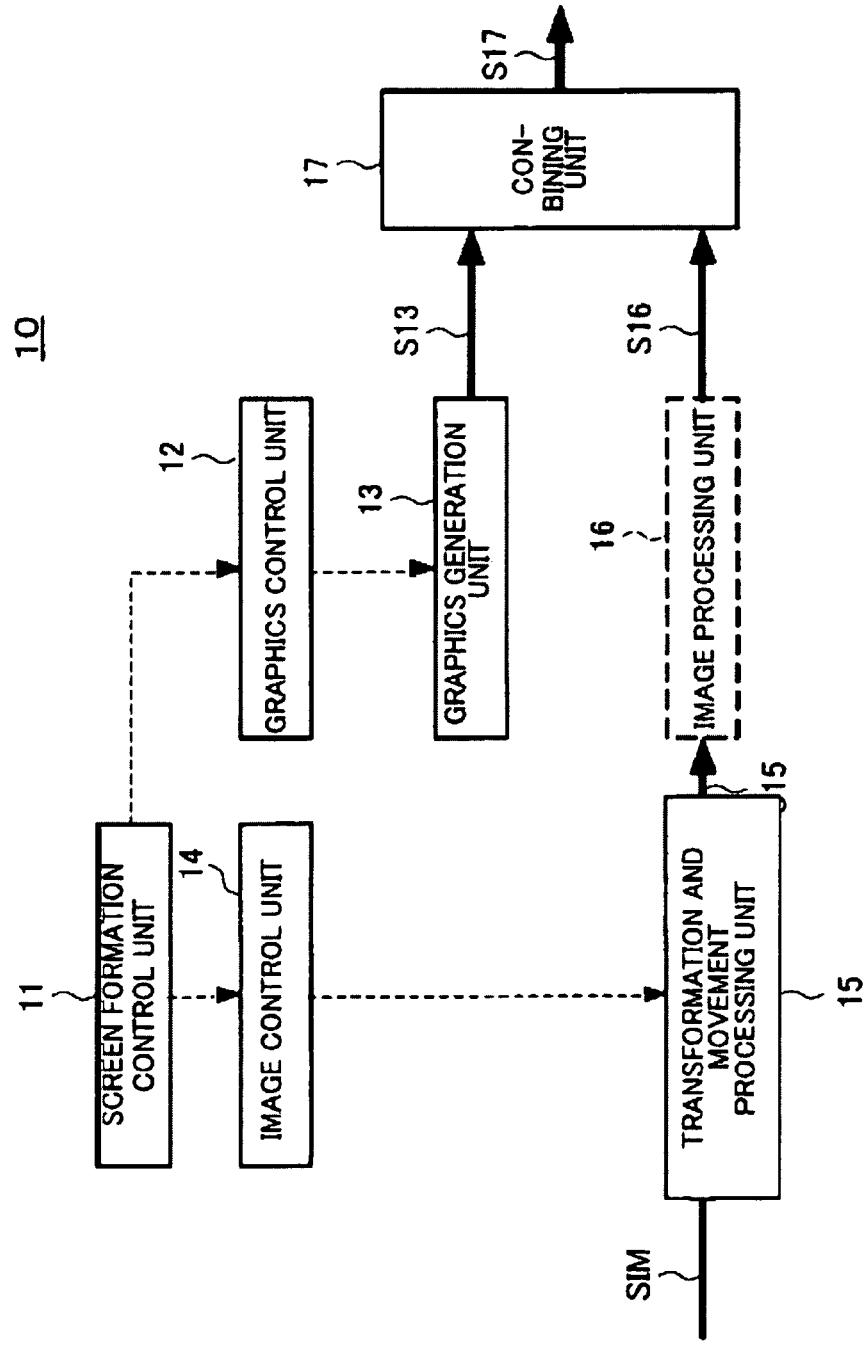
FIG. 1 is a block diagram of the configuration of a conventional data combining apparatus.
Figure 2:
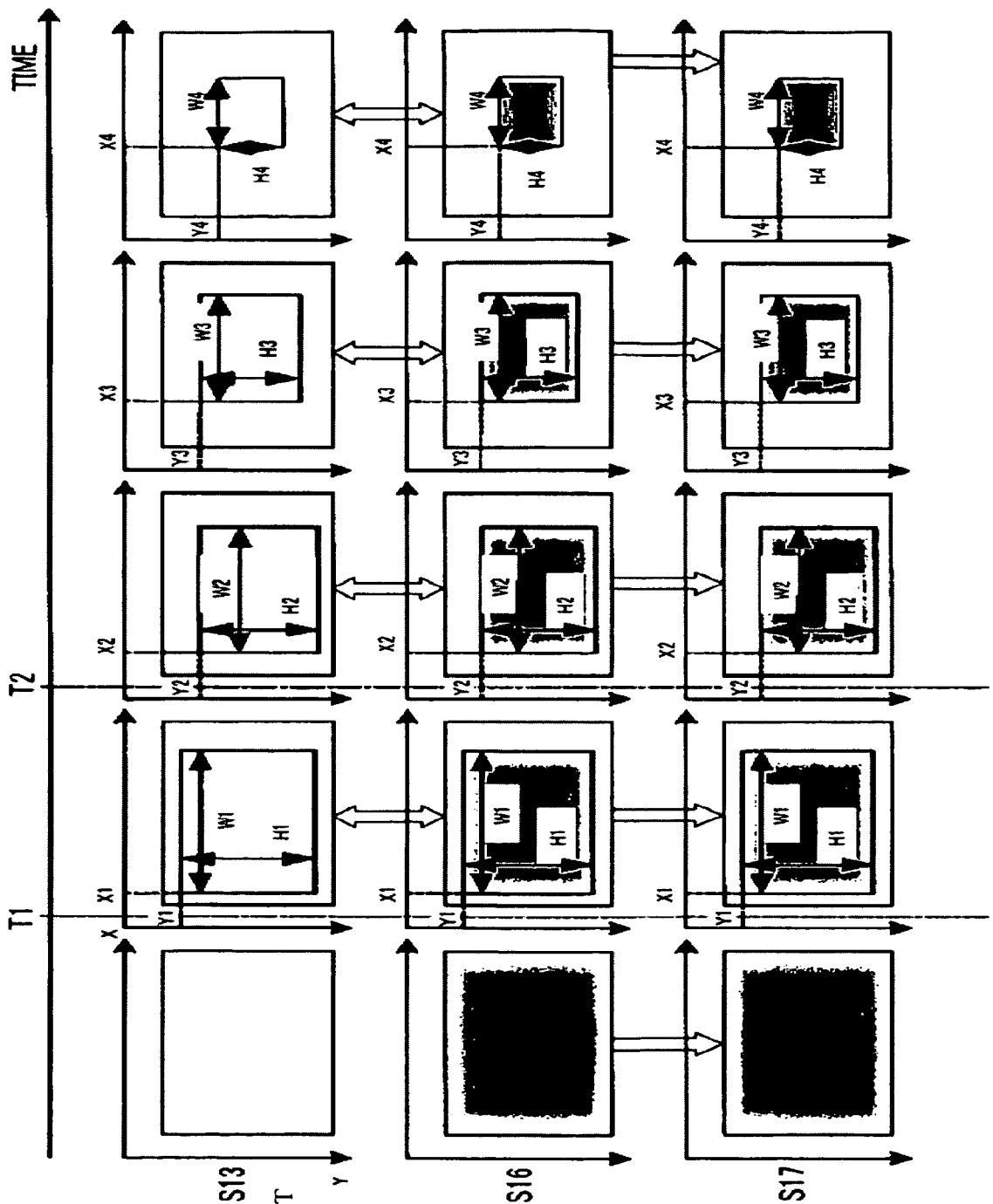
FIG. 2A to FIG. 2C are views showing an example of timing of combination of a graphics and image data.

The graphics control unit 102 normally can start the change of the screen formation at the time T1 as shown in FIG. 2A to FIG. 2C. However, in the present embodiment, it does not start the same at the time T based on the timing information.

Figure 3:
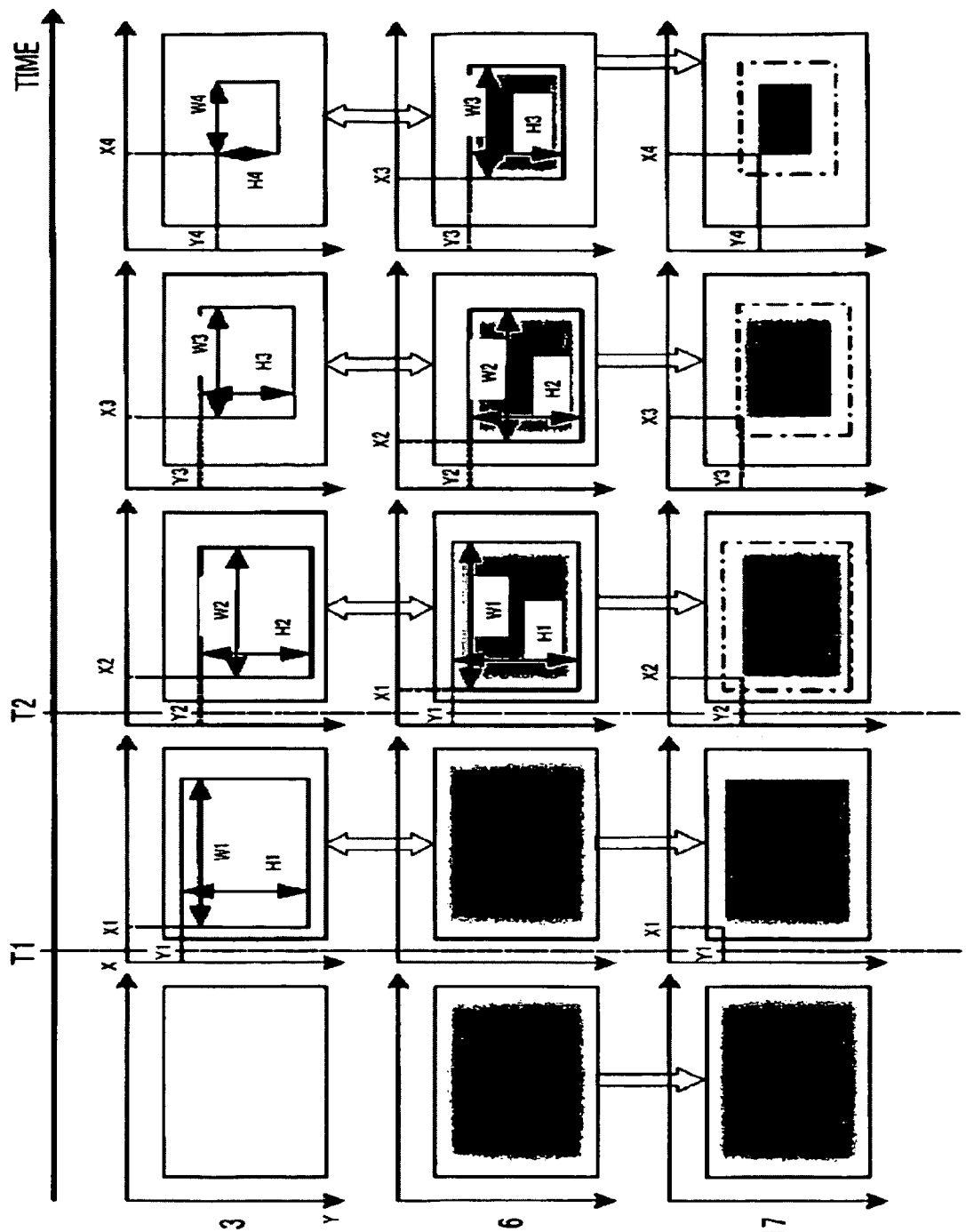
FIG. 3A to FIG. 3C are views for explaining a disadvantage in the case where the timing of combination is deviated in the conventional data combining apparatus.

Therefore, the graphics S103 to be combined and the image data S106 to be combined at the time T1 are combined without any contradiction in the screen formation such as in the conventional case shown in FIG. 3A to FIG. 3C.

At the time T2, the transformation and movement processing of the image data is started by the transformation and movement processing unit 105, so the timing information S108 at the time T2 indicates "start" (in the example shown in FIG. 5D, "1").

The graphics control unit 102 starts the change of the screen formation at the time T2 based on the timing information S108. After the start of the change of the screen formation, use of the timing information S108 enables combination while avoiding contradictions in the screen formation such as the conventional case shown in FIG. 3A to FIG. 3C.

Next, with reference to FIG. 6A to FIG. 6D, the control operation based on the timing information in the second case will be explained.

FIG. 6A to FIG. 6D are views for explaining the case where the graphics control unit 102 and the graphics generation unit 103 need delay until the timing information S108 is reflected.

Figure 6:
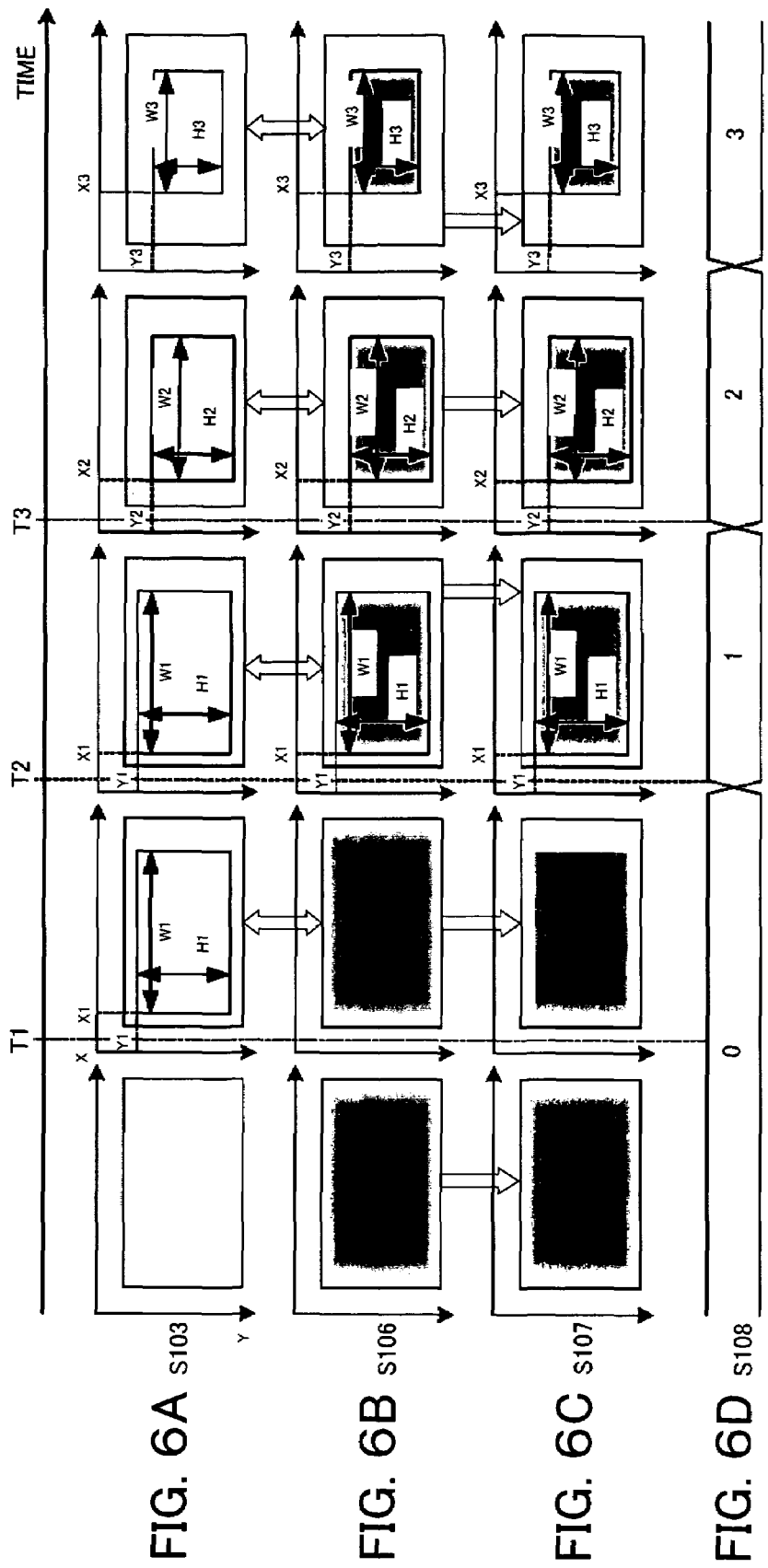
FIG. 6A to FIG. 6D are views for explaining the case in the first embodiment where delay is needed until the graphics control unit and the graphics generation unit reflect the timing information.

FIG. 6A shows the graphics S103 to be combined, FIG. 6B shows the image data S106 to be combined, FIG. 6C shows the combined data S107, and the FIG. 6D shows the timing information S108, respectively.

In this case, similar to the first case described above, the screen formation control unit 101 controls the change of the screen formation to perform the same from the time T1, however, the start of the transformation and movement processing of the image data performed by the transformation and movement processing unit 105 is delayed, so the processing starts at the time T2.

The graphics control unit 102 has a delay until the timing information S108 is reflected and starts the change of the screen formation at time T1 based on the instruction from the screen formation control unit 101.

Therefore, the combined result with respect to an object to be combined at the time T1 becomes combined data having a contradiction in the screen formation similar to the conventional case in FIG. 3A to FIG. 3C.

However, at the time T2, the graphics control unit 102 becomes possible to reflect the timing information 115 at the time T1. The timing information S108 at the time T1 indicates "not start (in the example shown in FIG. 6D, "0")", so a graphics stopping the change of the screen formation is generated.

At the time T3, the graphics control unit 102 refers to the timing information S108 at the time T2 and then learns that the transformation and movement processing of the image data by the transformation and movement processing unit 105 has started (in the example of the timing information shown in FIG. 6D, "1") at the time T2, so it restarts the change of the screen formation for the graphics to avoid contradiction in the screen formation.

After the time T2, by using the timing information S108, it is possible to combine them while avoiding contradiction in the screen formation such as the prior art shown in FIG. 3A to FIG. 3C.

Note that, if a side where delay can occur (the image data in the example shown in FIG. 6A to FIG. 6D) is displayed at the entire screen region before the change of the screen formation, by combining the screen formation by making the side where delay can occur the front, the combination can be performed so as not to affect the contradiction in the screen formation able to occur at the start of the change of the screen formation to the combined data.

Next, with reference to FIG. 7A to FIG. 7D, the control operation based on the timing information in the third case will be explained.

FIG. 7A to FIG. 7D are views for explaining the case where a countdown is introduced to the timing information so as to make the timing of the graphics and that of the image data match from the start of the change of the screen formation at all times even if the graphics control unit 102 and the graphics generation unit 102 need delay until the timing information 115 is reflected.

Figure 7:
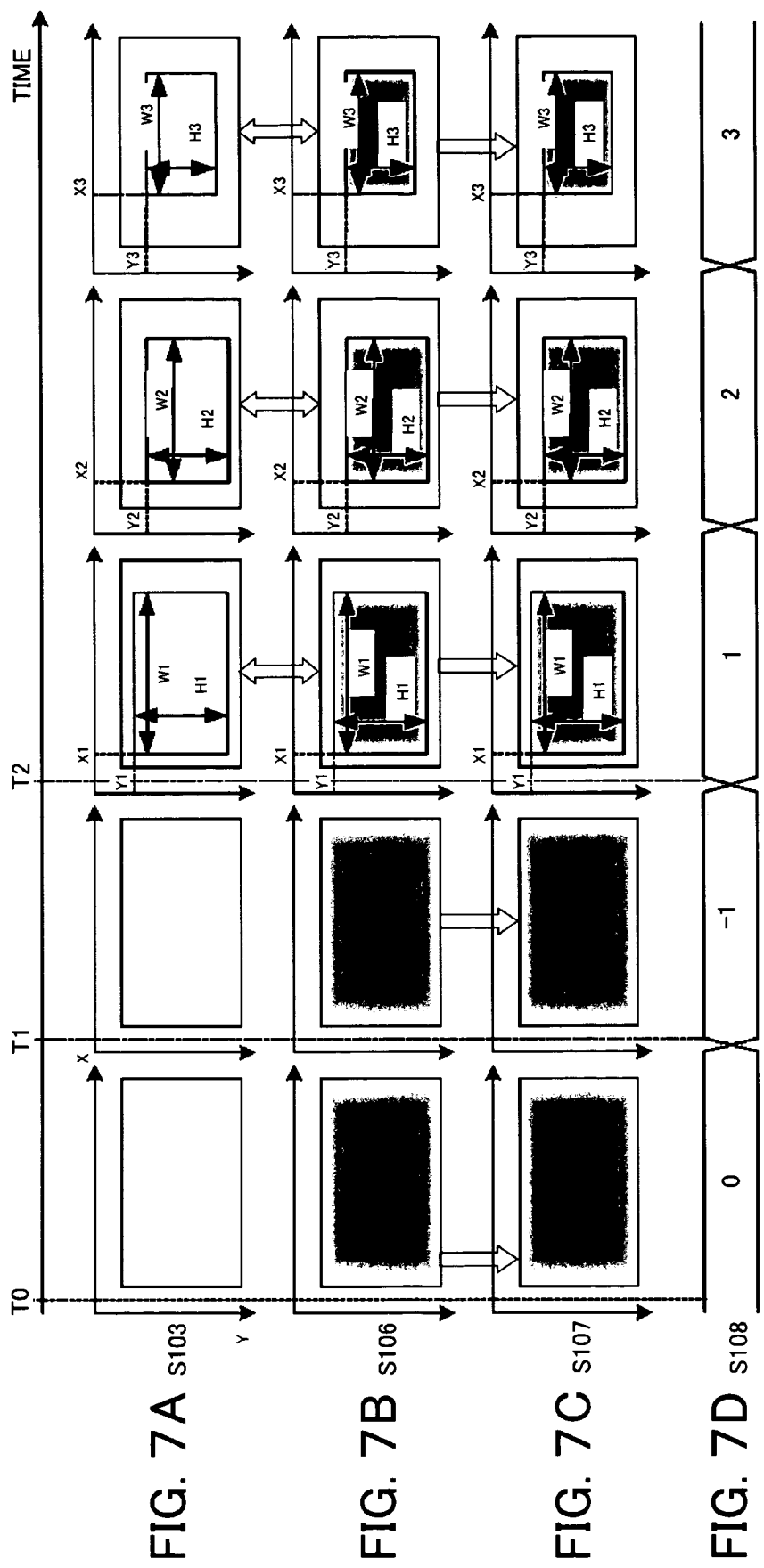
FIG. 7A to FIG. 7D are views for explaining the case in the first embodiment where a countdown is introduced to the timing information to make the timing of the graphics and that of the image data match all the time even when the graphics control unit and the graphics generation unit need delay until the timing information is reflected.

FIG. 7A shows the graphics S103 to be combined, FIG. 7B shows the image data S106 to the combined, FIG. 7C shows the combined data S107, and the FIG. 7D shows the timing information S108, respectively.

In this case, in the same way as the first case, the screen formation control unit 101 controls the change of the screen formation to perform the same at time T1 and additionally notifies the image control unit 104 at the time 0 in advance.

In the example shown in FIG. 7A to FIG. 7D, the start of the transformation and movement processing of the image data performed by the transformation and movement processing unit 105 is delayed, so the timing information S108 at the time T0 remains "0 (not started and not prepared)".

At the time T1, the graphics control unit 102 refers to the timing information at the time T0 and then leans "not started" by the timing information, so the graphics control unit 102 does not start the change of the screen formation.

The timing information S108 of the image data indicates "−1 (start countdown indicating to start at the following time)" at the time T1. The start countdown indicates a countdown up to a start time for the change of the screen formation of the image data.

At the time T2, the graphics control unit 102 refers to the timing information S108 in time T1 and then learns the start at the time T2 in advance due to "−1 (start countdown indicating to start at the following time)" of the timing information.

Therefore, the change of the screen formation is started at the time T2 for both the image data and the graphics. By introducing the countdown to the timing information S108 as described above, it becomes possible to make the timing of the graphics and that of the image data to be matched at all times even if the start of transformation and movement processing of the image data is delayed.

The explanations were made that cases without delay in the image processing unit 106 with reference to FIG. 5A to FIG. 5D, FIG. 6A to FIG. 6D, and FIG. 7A to FIG. 7D. When the data combining apparatus 100 is provided with an image processing unit 106 including delay, by making the timing information generation unit 108 consider the delay in the image processing unit 106 and output the timing information S108 corresponding to the time input to the combining unit 107, the present invention can be applied in the same way as when there is no delay in the image processing unit 106.

The explanations were made that cases where the start of the transformation and movement processing for the image data is delayed at the point of the start of the change of the screen formation with reference to FIG. 5A to FIG. 5D, FIG. 6A to FIG. 6D, and FIG. 7A to FIG. 7D. Further, when the start of the transformation and movement processing for the image data is advanced, it is clear that the correction can be performed by using the timing information S108 in the same way as when the start is delayed.

The explanations were made that cases where the change of the screen formation of the image data and the graphics is deviated at the point of start of the change with reference to FIG. 5A to FIG. 5D, FIG. 6A to FIG. 6D, and FIG. 7A to FIG. 7D. Further, when the deviation occurs in the middle of the change or when the deviation occurs at the end of the change, it is clear that the correction can be performed in the same way as when the deviation occurs at the point of the start of the change.

SECOND EMBODIMENT

Figure 8:
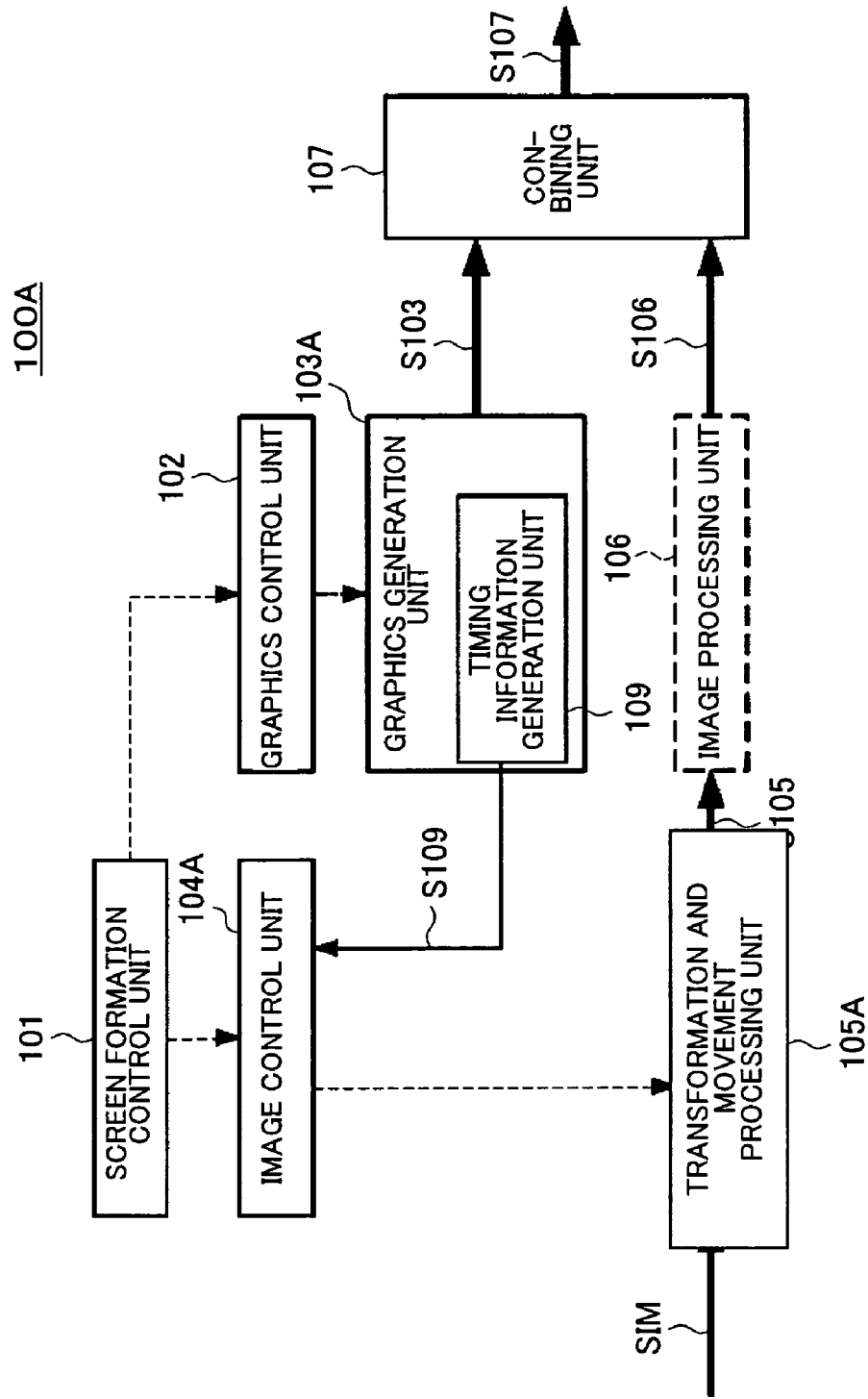
FIG. 8 is a block diagram of a second embodiment of the data combining apparatus according to the present invention.

FIG. 8 is a block diagram of a second embodiment of a data combining apparatus according to the present invention.

The point at which the second embodiment differs from the first embodiment will be described below.

Namely, in the first embodiment, the transformation and movement processing unit 105 of the image data is provided with the timing information generation unit 108, and the graphics control unit 102 detects and corrects a timing deviation based on the timing information S108.

On the other hand, in the second embodiment, contrary to the above, a graphics generation unit 103A is provided with a timing information generation unit 109, and an image control unit 104A detects and corrects the timing deviation based on the timing information S109 and controls a transformation and movement processing unit 105A so that the transformation and movement processing of the image data is performed under the corrected timing.

The rest of the components are the same as those of the first embodiment described above.

If replacing the timing of the graphics to be combined in FIG. 5A to FIG. 5D, FIG. 6A to FIG. 6D, and FIG. 7A to FIG. 7D with the timing of the image data to be combined, by making the image control unit 104A detect and correct the timing deviation based on the timing information in the same way as in the first embodiment, it is obvious that the effect of the deviation in timing for generating the graphics can be corrected.

THIRD EMBODIMENT

Figure 9:
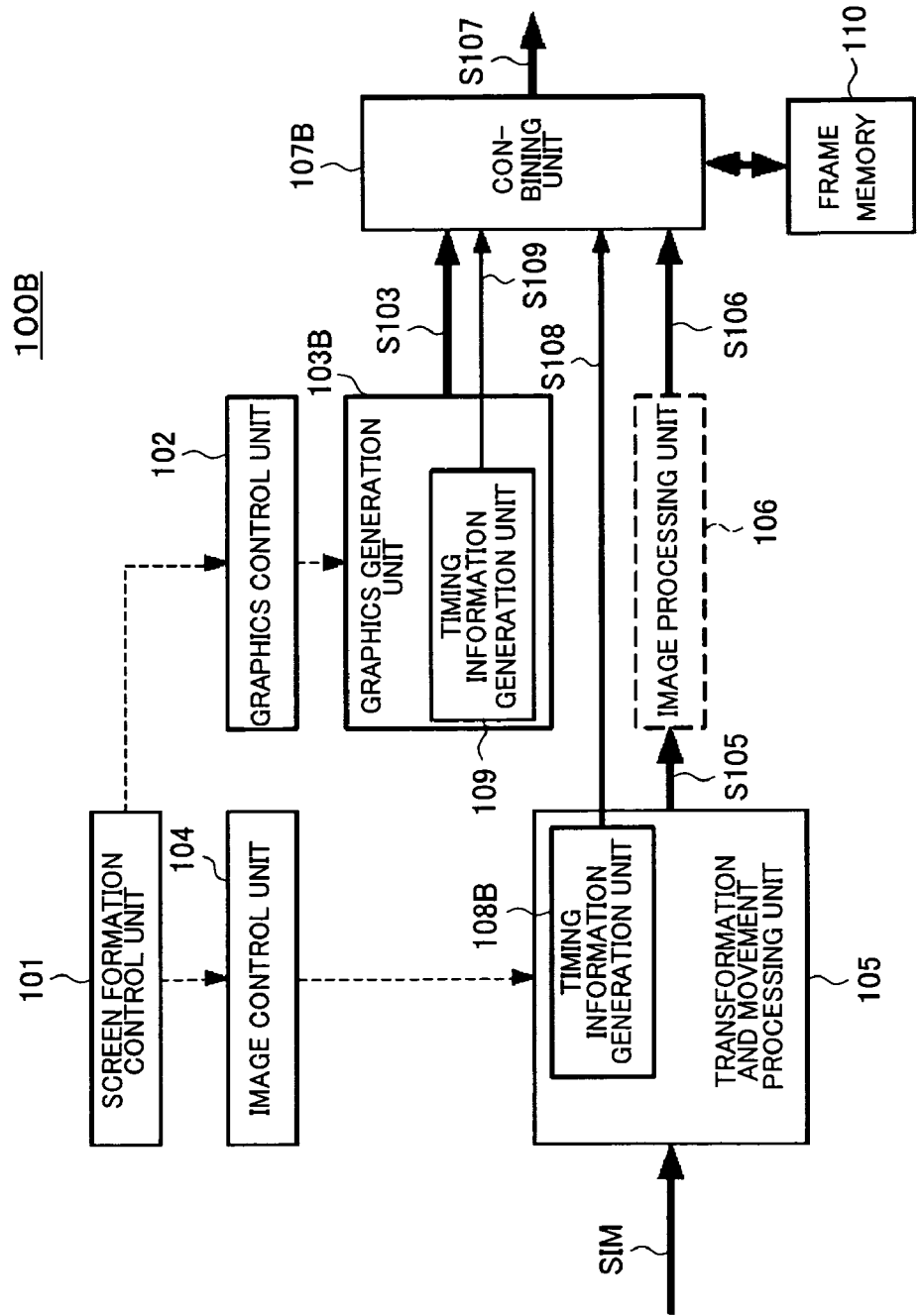
FIG. 9 is a block diagram of a third embodiment of the data combining apparatus according to the present invention.

FIG. 9 is a block diagram of a third embodiment of a data combining apparatus according to the present invention.

The point at which the third embodiment differs from the first and second embodiments will be described below.

Namely, in the first and second embodiment, the timing information of either the image data or the graphics is generated. The control unit for the object to be combined refers to the timing information and changes the timing of the transformation and movement processing or that of generation of the graphics to correct.

On the other hand, the data combining apparatus 100B in the third embodiment generates the timing information S108 and S109 for both the image data and the graphics and inputs the result to the combining unit 107B.

Then, the combining unit 107B refers to the timing information S108 and S109 of the data to be combined and delays and combines the inputs to be combined using the frame memory 110 so that the timings of the data to be combined match.

Next, the timing information in the third embodiment and the correction operation in the combining unit will be explained with reference to FIG. 10A to FIG. 10E.

Figure 10:
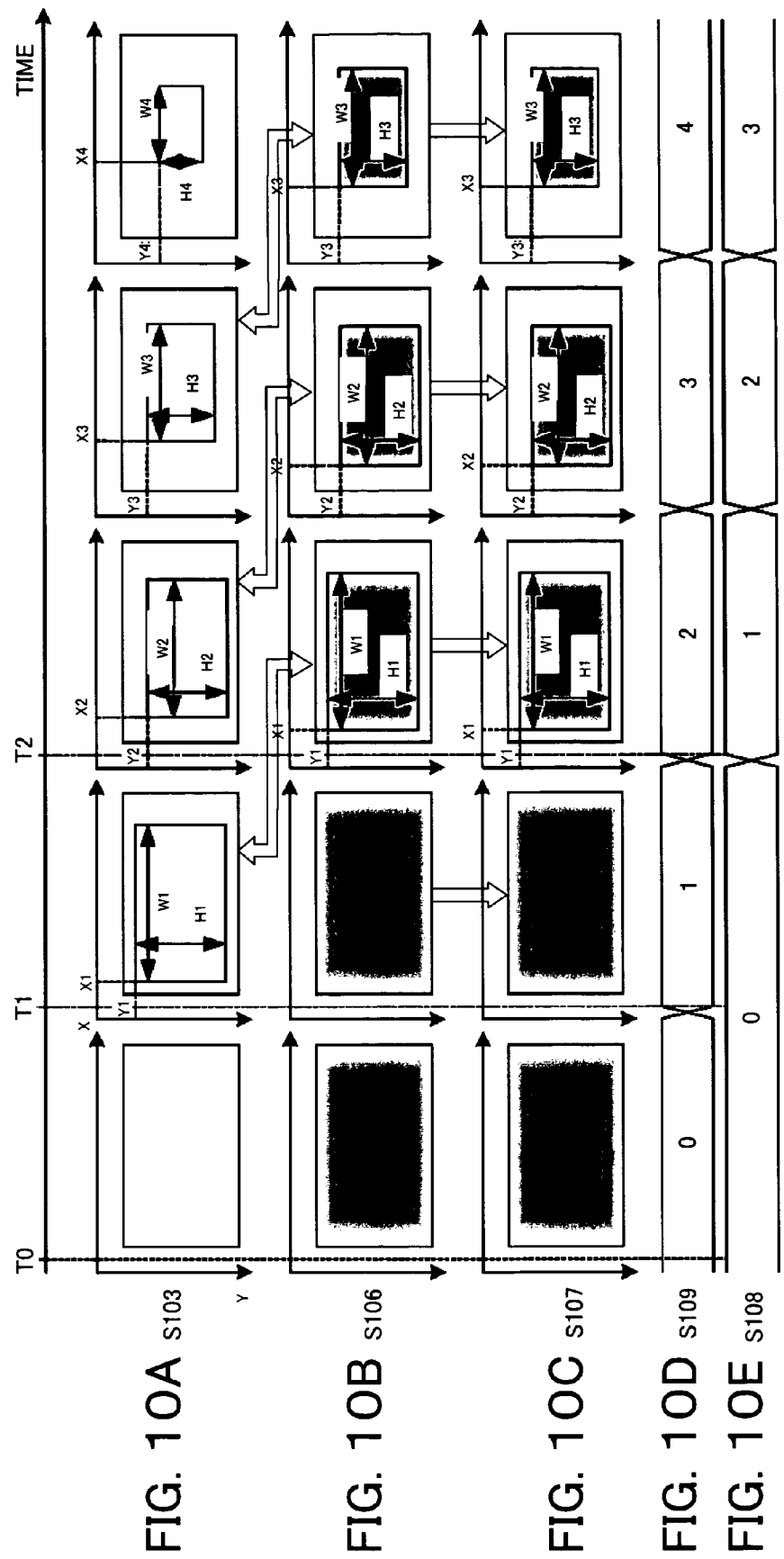
FIG. 10A to FIG. 10E are views for explaining the timing information in the third embodiment and a correction operation in a combining unit.

FIG. 10A shows the graphics S103 to be combined, FIG. 10B shows the image data S106 to be combined, FIG. 10C shows the combined data S107, FIG. 10D shows the timing information S109 of the graphics, and FIG. 10E shows the timing information S108 of the image data, respectively.

The screen formation control unit 101 controls the change of the screen formation to perform the same at the time T1. The graphics is started with the change of the screen formation at the time T1, so the timing information S109 of the graphics at the time T1 indicates "start (in the example shown in FIG. 10D, "1").

On the other hand, the start of the transformation and movement processing for the image data by the transformation and movement processing unit 105 is delayed, so the processing starts at time T2.

Therefore, the timing information S108 of the image data at time T1 indicates "not start (in the example shown in FIG. 10E, "0").

The combining unit 107B compares the two of the timing information and can detect that the change of the screen formation of the image data S106 to be combined is not started at the time T1.

In the example shown in FIG. 10A to FIG. 10E, at the time T1, only the image data S106 to be combined is output as the combined data, but it may be stored with the graphics S103 to be combined at the time T0 in the frame memory 110 and combined with the image data S106 to be combined at the time T1.

Alternatively, it may be stored with the combined data S107 at the time T0 in the frame memory 110 and output with the same repeatedly at the time T1.

The combining unit 107B detecting deviation of the timing information at the time T1 stores the data to be combined which is advanced in timing (in the example shown in FIG. 10A to FIG. 10E, the graphics S103 to be combined) on the frame memory 110 to delay the same.

The timing information S109 of the graphics at the time T2 indicates the second frame after start, while the timing information S108 for the image data indicates the first frame after start. Based on the timing information, the combining unit 107B can detect the delay of one frame's worth of the image data S106.

Therefore, in the combination at the time T2, the graphics S103 to be combined at the time T1 stored on the frame memory 110 is used to delay the graphics and correct it so as to match with the timing of the image data S106.

After that, a similar operation may be used to combine graphics and image data matched in timing at all times.

Further, in the third embodiment as well, by adding a countdown up to the start of the change of the screen formation to the timing information, the image timing information at the time T1 shown in FIG. 10A to FIG. 10E indicates preparation for start, so the combining unit can learn that the graphics may be delayed by one frame's worth of time at the time T1 in advance.

Next, the method of transfer of different timing information will be explained with reference to FIG. 11.

Figure 11:
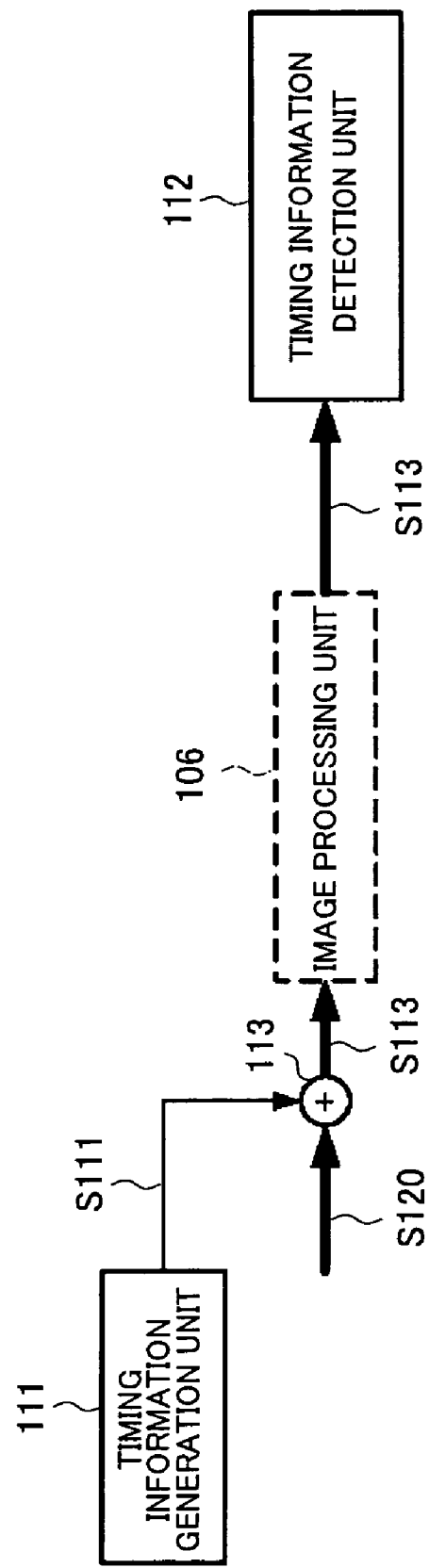
FIG. 11 is a view for explaining the processing from generation of the timing information to detection thereof in the case of superposing the timing information on data.

In FIG. 11, 111 indicates a timing information generation unit, 112 indicates a timing information detection unit, and 113 indicates an addition unit as the superposing part, respectively.

The data combining apparatus 100, 100A, and 100B shown in FIG. 4, FIG. 8, and FIG. 9 transfer the timing information separately from the graphics and the image data.

The method of transfer of the timing information shown in FIG. 11 is to superpose the timing information S111 to the image data or the graphics S120 in the addition unit 113 and detect the superposed timing information in the image data or the graphics included in the superposed data S113 by the timing information detection unit 112.

According to this method of transfer, no communicating means for transferring the timing information separately from the data is necessary.

In particular, this method has an advantage that when the data is delayed by the image processing unit 106, the timing information can be delayed without any additional processing performed by the image processing unit 106.

In the first and second embodiments described above as well, it is possible to apply the method of transfer superposing the timing information to the image data or the graphics by making the timing information detection unit 112 notify the corresponding control unit of the timing information.

In particular, it is possible to transfer timing information without any effect on the graphics and the image data by superposing the timing information on a blanking period of the graphics and the image data (portion outside of available region for the screen formation).

As described above, according to the present invention, there is the advantage that the combination of a screen formation to be needed for matching of the timing becomes possible by generating the timing information of, for example transformation, movement (arrangement), and generation of data forming the screen and correcting the timing for transformation, movement (arrangement), and generation of data to be combined in accordance with the timing information.

Further, according to the present invention, the combination of a screen formation to be needed for matching of the timing becomes possible by generating the timing information of, for example, transformation, movement (arrangement), and generation of data forming the screen, comparing the timing information of the data to be combined in a combination stage, and correcting the timing of combination.

Further, by adding a countdown up to the start of the change of the screen formation to the timing information, it is possible to correct the timing without contradiction from the point of start of the change of the screen formation even in a system where the timing information cannot be immediately reflected.

Further, by superposing the timing information in the data to be combined, a communicating part for transferring the timing information separately from the data can be made unnecessary.

In particular, if the control units are configured by a plurality of processors, if communication path between the control units or between a control unit and a processing unit is connected by a bus including delay, if the communication takes time, if the control units and the processing unit are configured by software, or if a plurality of data to be combined are input asynchronously, according to the present invention, a desired screen formation can be formed by combination free from contradiction.

INDUSTRIAL APPLICABILITY

According to the data combining apparatus and data combining method of the present invention, the timing of transformation, movement (arrangement), and generation of data combined in accordance with the timing information can be corrected and the screen formation to be needed for matching of the timing can be formed by combination, consequently the invention can be applied to a TV broadcast receiver, a TV monitor, a PC monitor, an editing apparatus, and a multimedia data reproduction apparatus which combine still image data, moving image data, and graphics etc. to form a screen.

The invention claimed is:

1. A data combining apparatus combining first data and second data relating to an image to form a screen comprising:
   a processing unit for performing predetermined processing on the first data;
   a data generation unit for generating the second data;
   a combining unit for combining the first data processed by the predetermined processing in the processing unit and the second data generated by the data generation unit;
   a timing information generation unit for generating timing information for the processing of the processing unit or for processing for generation of the data generation unit so that the combination of the first data processed by the predetermined processing in the processing unit and the second data generated by the generation unit is performed at the same timing;

a superposing unit for superposing the timing information generated by the timing information generation unit to the first data or the second data;

a timing information detection unit for detecting the superposed timing information in the first data or the second data; and a control unit for correcting a timing for processing or generation to make the processing unit or the data generation unit perform the predetermined processing or data generation based on the timing information generated by the timing information generation unit.

2. A data combining apparatus as set forth in claim 1, further comprising a second processing unit for performing processing introducing a delay to the first data processed by the predetermined processing by the processing unit, and wherein the timing information generation unit adds an amount of delay in the second processing unit and generates timing information indicating an input timing to the combining unit.

3. A data combining apparatus as set forth in claim 1, wherein the timing information generation unit generates timing information including a countdown up to start of a change of screen formation.

4. A data combining apparatus as set forth in claim 1, wherein the control unit makes the processing unit or the data generation unit correct the timing of processing or generation and perform the predetermined processing or the data generation based on the superposed timing information.

5. A data combining apparatus as set forth in claim 4, wherein the superposing unit superposes the timing information on a blanking period of the first data or the second data relating to an image.

6. A data combining apparatus combining first data and second data relating to an image to form a screen comprising:

a processing unit for performing predetermined processing on the first data;

a data generation unit for generating the second data;

a combining unit for combining the first data processed by the predetermined processing in the processing unit and the second data generated by the data generation unit;

a timing information generation unit for generating at least one of the timing information of the processing in the processing unit and the processing for generation in the data processing unit so that the combination of the first data processed by the predetermined processing in the processing unit and the second data generated by the generation unit is performed at the same timing in the combining unit;

a superposing unit for superposing the timing information generated by the timing information generation unit to the first data or the second data;

a timing information detection unit for detecting the superposed timing information in the first data or the second data; and a control unit for correcting a timing for processing or generation to make the processing unit or the data generation unit perform the predetermined processing or data generation based on the timing information generated by the timing information generation unit, wherein, the combining unit corrects and combines the data at the same timing based on the timing information generated by the timing information generation unit.

7. A data combining apparatus as set forth in claim 6, further comprising a second processing unit for performing processing introducing a delay to the first data processed by the predetermined processing by the processing unit, and wherein the timing information generation unit adds an amount of delay in the second processing unit and generates the timing information indicating an input timing to the combining unit.

8. A data combining apparatus as set forth in claim 6, wherein the timing information generation unit generates timing information including a countdown up to a start of a change of screen formation.

9. A data combining apparatus as set forth in claim 6, wherein the combining unit corrects and combines the data at the same timing based on the superposed timing information.

10. A data combining apparatus as set forth in claim 9, wherein the superposing unit superposes timing information to a blanking period of the first data or the second data relating to an image.

11. A data combining method combining first data and second data relating to an image to form a screen, the method comprising:

a first step of performing predetermined processing on the first data;

a second step of generating the second data;

a third step of combining the first data processed by the predetermined processing at the first step and the second data generated by the second step;

a fourth step of superposing the generated timing information on the first data or the second data, and, at the first step or the second step; and a fifth step of detecting the superposed timing information in the first data or the second data, so as to correct the timing of processing or generation to perform the predetermined processing or the data generation based on the superposed timing information, wherein, the timing information for the processing at the first step or the process for generation at the second step is generated so that the combination of the first data processed by the predetermined processing at the first step and the second data generated at the second step is performed at the same timing in the third step, and at the first step or at the second step; and the timing for processing or generation is corrected based on the timing information to perform the predetermined processing or the data generation.

12. A data combining method as set forth in claim 11, further comprising: performing processing introducing a delay to the first data processed by the predetermined processing at the first step as a fourth step, and generating the timing information considering the amount of delay of the fourth step.

13. A data combining method as set forth in claim 11, further comprising generating timing information including a countdown up to the start of a change of screen formation.

14. A data combining method as set forth in claim 11, further comprising superposing the timing information to a blanking period of the first data or the second data relating to an image.

15. A data combining method combining first data and second data relating to an image to form a screen comprising:

a first step of performing predetermined processing on the first data;

a second step of generating the second data;

a third step of combining the first data processed by the predetermined processing at the first step and the second data generated by the second step;

a fourth step of superposing the generated timing information on the first data or the second data, and, at the first step or the second step; and a fifth step of detecting the superposed timing information in the first data or the second data, so as to correct the timing of processing or generation to perform the predetermined processing or the data generation based on the superposed timing information, wherein, at least one of the timing information for the processing at the first step and the processing for generation at the second step is generated so that the combination of the first data processed by the predetermined processing at the first step and the second data generated at the second step is performed at the same timing in the third step, in the third step the data is corrected and combined at the same timing based on the timing information.

16. A data combining method as set forth in claim 15, further comprising: performing processing introducing a delay to the first data processed by the predetermined processing at the first step as a fourth step and generating the timing information by considering the amount of delay in the fourth step.

17. A data combining method as set forth in claim 15, further comprising generating timing information including a countdown up to the start of a change of screen formation.

18. A data combining method as set forth in claim 15, further comprising superposing the timing information to a blanking period of the first data or the second data relating to an image.

* * * * *